United States Patent
Kiyono et al.

(10) Patent No.: US 10,989,158 B2
(45) Date of Patent: Apr. 27, 2021

(54) CONTROLLER FOR INTERNAL COMBUSTION ENGINE AND METHOD FOR CONTROLLING INTERNAL COMBUSTION ENGINE

(71) Applicant: TOYOTA JIDOSHA KABUSHIKI KAISHA, Toyota (JP)

(72) Inventors: Hisao Kiyono, Toyota (JP); Takayuki Omachi, Nisshin (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 16/581,894

(22) Filed: Sep. 25, 2019

(65) Prior Publication Data
US 2020/0124016 A1  Apr. 23, 2020

(30) Foreign Application Priority Data

Oct. 17, 2018 (JP) .............................. JP2018-195705

(51) Int. Cl.
| F02P 5/04 | (2006.01) |
|---|---|
| F02D 41/40 | (2006.01) |
| F02P 5/145 | (2006.01) |
| F02D 41/34 | (2006.01) |
| F02D 37/02 | (2006.01) |

(52) U.S. Cl.
CPC .............. *F02P 5/045* (2013.01); *F02D 37/02* (2013.01); *F02D 41/345* (2013.01); *F02D 41/405* (2013.01); *F02P 5/145* (2013.01)

(58) Field of Classification Search
CPC ......... F02P 5/045; F02P 5/145; F02D 41/405; F02D 41/345; F02D 37/02

USPC ................................... 123/406.47, 299, 304
See application file for complete search history.

(56) References Cited

U.S. PATENT DOCUMENTS

| 2004/0163379 A1* | 8/2004 | Pott ........................ F02D 41/402 60/284 |
|---|---|---|
| 2010/0250100 A1* | 9/2010 | Tomiita .............. F02M 61/1853 701/104 |
| 2012/0318237 A1* | 12/2012 | Tsukagoshi ............. F02D 41/34 123/445 |

FOREIGN PATENT DOCUMENTS

| EP | 1728997 A2 | 12/2006 |
|---|---|---|
| JP | H05-256172 A | 10/1993 |
| JP | 2012-136959 A | 7/2012 |
| JP | 2013-87624 A | 5/2013 |
| JP | 2015-59456 A | 3/2015 |

* cited by examiner

*Primary Examiner* — Mahmoud Gimie
(74) *Attorney, Agent, or Firm* — Oliff PLC

(57) ABSTRACT

A controller for an internal combustion engine includes processing circuitry. The processing circuitry executes a selecting process that selects one of a multi-injection process or a single injection process. The multi-injection process includes executing an intake synchronous injection and an intake asynchronous injection. The single injection process includes executing the intake asynchronous injection. In the intake synchronous injection, the fuel is injected in synchronization with a period in which an intake valve is open. In the intake asynchronous injection, the fuel is injected at timing advanced from timing of executing the intake synchronous injection. The processing circuitry changes ignition timing to a retarded side value in accordance with switching from execution of the multi-injection process to execution of the single injection process.

8 Claims, 8 Drawing Sheets

CONTROLLER FOR INTERNAL COMBUSTION ENGINE AND METHOD FOR CONTROLLING INTERNAL COMBUSTION ENGINE

BACKGROUND

1. Field

The present disclosure relates to a controller for an internal combustion engine and a method for controlling an internal combustion engine.

2. Description of Related Art

For example, Japanese Laid-Open Patent Publication No. 5-256172 describes a controller that executes a multi-injection process that operates a port injection valve to inject fuel requested in one combustion cycle through an intake stroke injection, which injects fuel in the intake stroke, and a combustion stroke injection, which injects fuel in the combustion stroke. The amount of fuel injected in the intake stroke is referred to as an intake stroke injection amount. The amount of fuel injected in the combustion stroke is referred to as a combustion stroke injection amount. The amount of fuel requested in one combustion cycle is equal to the sum of the intake stroke injection amount and the combustion stroke injection amount. The ratio of the intake stroke injection amount to the combustion stroke injection amount is referred to as a division ratio. The above controller sets the division ratio in accordance with the rotational speed of the crankshaft of the internal combustion engine and performs a single injection process, which includes only the combustion stroke injection particularly in a low rotation region.

In the intake stroke injection, the fuel readily reaches the combustion chamber without touching the intake system as compared with in the combustion stroke injection. Thus, the intake stroke injection easily causes the temperature of the air-fuel mixture in the combustion chamber to be lowered by vaporization of the fuel in the combustion chamber. In the multi-injection process, which includes the intake stroke injection, knocking is less likely to occur than in the single injection process, which does not include the intake stroke injection. Thus, when executing the multi-injection process, the ignition timing tends to be set to an advanced side as compared to when executing the single injection process. Therefore, knocking may occur when switching from the multi-injection process to the single injection process.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Hereinafter, multiple aspects of the present disclosure and the operation and effect of the aspects will be described.

Aspect 1. A controller for an internal combustion engine that includes a port injection valve configured to inject fuel into an intake passage and an ignition device configured to cause spark discharge to occur in a combustion chamber is provided. The controller includes processing circuitry. The processing circuitry is configured to execute a selecting process that selects one of a multi-injection process or a single injection process, an injecting process that operates the port injection valve to execute one of the multi-injection process or the single injection process selected by the selecting process, and an ignition process that operates the ignition device. An injection amount requested in one combustion cycle is a request injection amount. The multi-injection process includes executing an intake synchronous injection and an intake asynchronous injection to inject fuel of the request injection amount. The single injection process includes executing the intake asynchronous injection to inject fuel of the request injection amount. In the intake synchronous injection, the fuel is injected in synchronization with a period in which an intake valve is open. In the intake asynchronous injection, the fuel is injected at timing advanced from timing of executing the intake synchronous injection. The ignition process includes a switching process that changes ignition timing to a retarded side value in accordance with switching from execution of the multi-injection process to execution of the single injection process.

The fuel injected by the intake synchronous injection readily reaches a position of the intake valve when the intake valve is closed in a period in which the intake valve is open and readily flows into the combustion chamber. Thus, the intake synchronous injection may lower the temperature of the combustion chamber by the latent heat of vaporization as compared with an asynchronous injection. The temperature of the combustion chamber tends to be lower at time of execution of the multi-injection process including the intake synchronous injection, as compared with time of execution of the single injection process in which only the intake asynchronous injection is performed. As a result, knocking can be limited. The ignition timing that is optimized to maximize torque while limiting knocking is referred to as optimized ignition timing. The optimized ignition timing at time of the multi-injection process is further advanced than the optimized ignition timing at time of execution of the single injection process. When appropriate ignition timing is set at time of execution of the multi-injection process, the multi-injection process may be switched to the single injection process. In this case, if the ignition timing at time of execution of the single injection process is the same as the ignition timing at time of execution of the multi-injection process, occurrence of knocking may become apparent. In the above configuration, the ignition timing is changed to a retarded side value in accordance with the switching from execution of the multi-injection process to execution of the single injection process. This limits appearance of knocking that occurs in accordance with the switching from the multi-injection process to the single injection process.

Aspect 2. In the controller according to aspect 1, the switching process may include a process that advances the ignition timing in accordance with switching from execution of the single injection process to execution of the multi-injection process.

When appropriate ignition timing is set at time of execution of the single injection process, the single injection process may be switched to the multi-injection process. In this case, if the ignition timing at time of execution of the multi-injection process is the same as the ignition timing at time of execution of the single injection process, the ignition timing may be undesirably set to a retarded side value, which may undesirably lower the efficiency. Therefore, in the above configuration, the lowering in efficiency can be limited by advancing the ignition timing in accordance with the switching from the execution of the single injection process to the execution of the multi-injection process.

Aspect 3. In the controller according to aspect 1 or 2, the ignition process may include a feedback correction amount calculating process that calculates a feedback correction amount based on an output signal of a knocking sensor, the feedback correction amount being an operation amount for operating the ignition timing by feedback control, and the ignition timing being allowed to be operated toward an advanced side within a range in which occurrence of knocking is limited, and an updating process that updates a learning value to decrease an absolute value of the feedback correction amount. The switching process may include a setting process that sets the ignition timing based on the feedback correction amount and the learning value, and a process that switches between a learning value used in the setting process at time of execution of the multi-injection process and a learning value used in the setting process at time of execution of the single injection process.

The learning value is updated to decrease the absolute value of the feedback correction amount. The learning value is different between when the single injection process is steadily performed and when the multi-injection process is steadily performed. In a configuration in which the multi-injection process and the single injection process use the same learning value, the learning value may not be appropriate immediately after switching from the single injection process to the multi-injection process or immediately after switching from the multi-injection process to the single injection process. In this regard, in the above configuration, the learning value in the single injection process and the learning value in the multi-injection process are switched. Thus, the appropriate ignition timing is quickly set in accordance with the switching from the single injection process to the multi-injection process and the switching from the multi-injection process to the single injection process.

Aspect 4. In the controller according to aspect 3, the learning value used at time of execution of the single injection process is a single injection learning value, the learning value used at time of execution of the multi-injection process is a multi-injection learning value, and the multi-injection learning value may be obtained by correcting the single injection learning value with a multi-correction amount, which is an advance-side correction amount. The switching process may include a process that sets the multi-injection learning value to the learning value used in the setting process at time of execution of the multi-injection process. The updating process may include a process that updates the single injection learning value based on the feedback correction amount when the single injection process is being executed, and a process that updates the multi-correction amount based on the feedback correction amount when the multi-injection process is being executed.

In the above configuration, the multi-correction amount is used to obtain a learning value appropriate for both the multi-injection process and the single injection process as the single injection learning value is used as the base.

Aspect 5. In the controller according to aspect 4, the updating process may include updating the multi-correction amount separately according to a rotational speed and a load of a crankshaft of the internal combustion engine.

The above configuration determines a learning value that appropriately reflects variations in easiness of occurrence of knocking that depend on rotational speed, load, and the like.

Aspect 6. In the controller according to aspect 4 or 5, the switching process may include a retarding process that sets an ignition timing obtained by retarding an ignition timing determined based on the multi-injection learning value by a multi-retardation amount in accordance with switching from execution of the single injection process to execution of the multi-injection process and a shifting process that shifts the ignition timing set by the retarding process to the ignition timing determined based on the multi-injection learning value by gradually reducing the multi-retardation amount.

The multi-injection learning value tends to be appropriate when the multi-injection process is steadily executed. However, immediately after switching from the single injection process to the multi-injection process, the temperature in the combustion chamber may be high and knocking may readily occur as compared with when the multi-injection process is steadily executed. In this regard, in the above configuration, the ignition timing is set to be retarded from the ignition timing that is determined based on the multi-injection learning value in accordance with the switching from the execution of the single injection process to the execution of the multi-injection process, and the ignition timing is gradually advanced. This limits occurrence of knocking immediately after switching to the multi-injection process.

Aspect 7. In the controller according to any one of aspects 4 to 6, the switching process may include a retarding process that sets an ignition timing obtained by retarding an ignition timing determined based on the single injection learning value by a single retardation amount in accordance with switching from execution of the multi-injection process to execution of the single injection process, and a shifting process that shifts the ignition timing set by the retarding process to the ignition timing determined based on the single injection learning value by gradually reducing the single retardation amount.

In the above configuration, in accordance with the switching from execution of the multi-injection process to execution of the single injection process, the ignition timing is temporarily retarded from the ignition timing that is determined based on the single injection learning value. This limits occurrence of knocking in transition time including change in combustion state.

Aspect 8. A method for controlling an internal combustion engine that includes a port injection valve configured to inject fuel into an intake passage and an ignition device configured to cause spark discharge to occur in a combustion chamber is provided. The method includes executing a selecting process that selects one of a multi-injection process or a single injection process, executing an injecting process that operates the port injection valve to execute one of the multi-injection process or the single injection process selected by the selecting process, and executing an ignition process that operates the ignition device. An injection amount requested in one combustion cycle is a request injection amount. The multi-injection process includes executing an intake synchronous injection and an intake asynchronous injection to inject fuel of the request injection amount. The single injection process includes executing the intake asynchronous injection to inject fuel of the request injection amount. In the intake synchronous injection, the fuel is injected in synchronization with a period in which an intake valve is open. In the intake asynchronous injection, the fuel is injected at timing advanced from timing of executing the intake synchronous injection. The ignition process includes a switching process that changes ignition timing to a retarded side value in accordance with switching from execution of the multi-injection process to execution of the single injection process.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

Hereinafter, a first embodiment of a controller for an internal combustion engine will be described with reference to the drawings.

Figure 1:
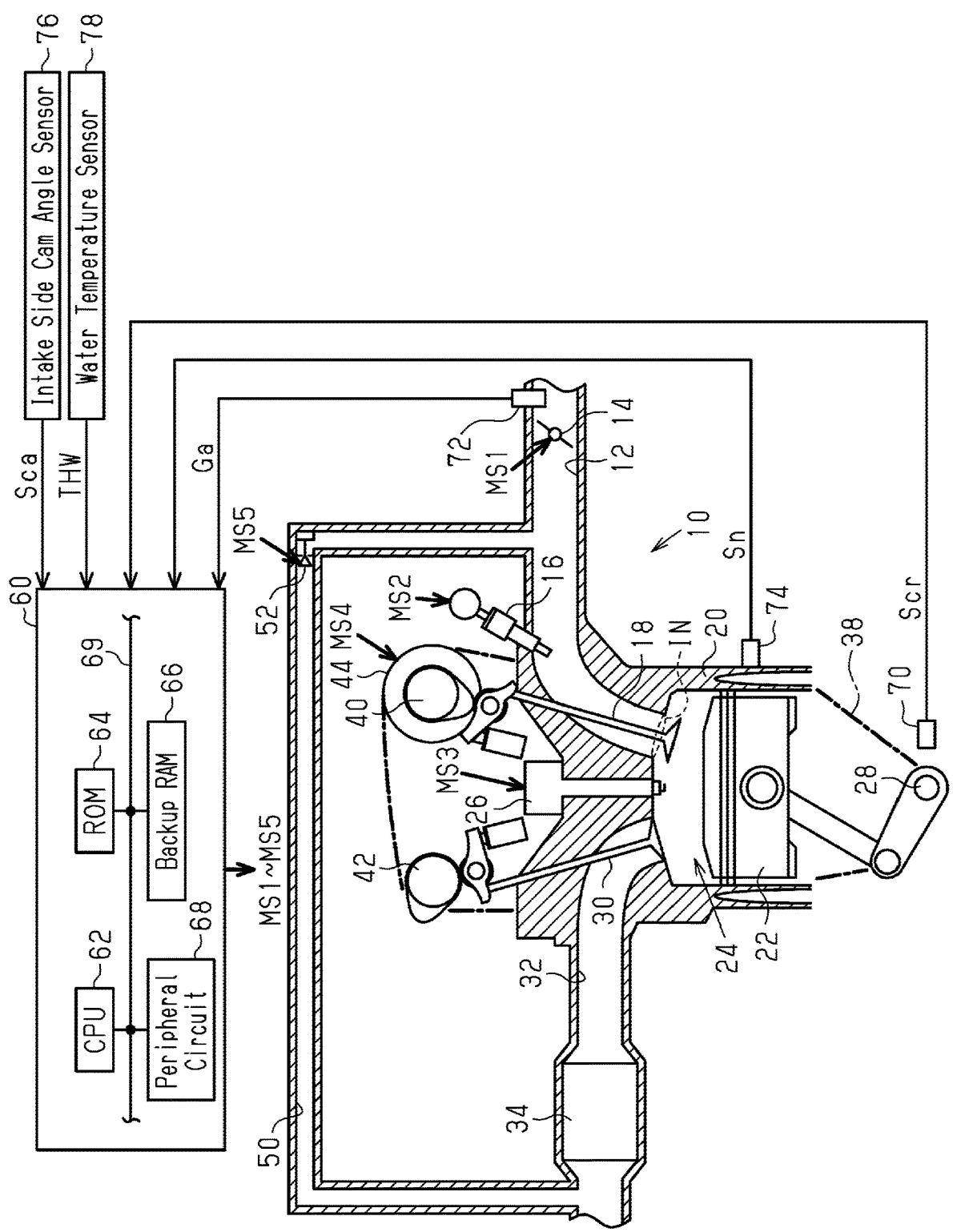
FIG. 1 is a diagram showing an internal combustion engine and a controller for the internal combustion engine according to a first embodiment.

FIG. 1 shows an internal combustion engine 10 mounted on a vehicle. The internal combustion engine 10 includes an intake passage 12 in which a throttle valve 14 and a port injection valve 16 are sequentially provided from the upstream side. When an intake valve 18 opens, air drawn into the intake passage 12 and fuel injected from the port injection valve 16 flow into a combustion chamber 24 defined by a cylinder 20 and a piston 22. In the combustion chamber 24, the air-fuel mixture is burned by spark discharge of an ignition device 26. Combustion energy generated by the combustion is converted into rotational energy of a crankshaft 28 through the piston 22. The burned air-fuel mixture is discharged to an exhaust passage 32 as exhaust air when an exhaust valve 30 opens. The exhaust passage 32 includes a catalyst 34.

The rotational power of the crankshaft 28 is transmitted to an intake side camshaft 40 and an exhaust side camshaft 42 through a timing chain 38. In the first embodiment, the power of the timing chain 38 is transmitted to the intake side camshaft 40 through an intake side valve timing adjustment device 44. The intake side valve timing adjustment device 44 is an actuator that adjusts the opening timing of the intake valve 18 by adjusting the rotational phase difference between the crankshaft 28 and the intake side camshaft 40.

An EGR passage 50 that connects the exhaust passage 32 and the intake passage 12 is connected to the exhaust passage 32 downstream of the catalyst 34. The EGR passage 50 is provided with an EGR valve 52 that adjusts the cross-sectional area of the flow passage.

The controller 60 controls the internal combustion engine 10 and operates operation units of the internal combustion engine 10 such as the throttle valve 14, the port injection valve 16, the ignition device 26, the intake side valve timing adjustment device 44, and the EGR valve 52 to control engine aspects (torque, exhaust component ratio, etc.). At this time, the controller 60 refers to an output signal Scr of a crank angle sensor 70, an intake air amount Ga detected by an air flow meter 72, an output signal Sn of a knocking sensor 74, an output signal Sca of an intake side cam angle sensor 76, and the temperature of cooling water (water temperature THW) of the internal combustion engine 10 detected by a water temperature sensor 78. FIG. 1 shows operation signals MS1 to MS5 for operating the throttle valve 14, the port injection valve 16, the ignition device 26, the intake side valve timing adjustment device 44, and the EGR valve 52, respectively.

The controller 60 includes a CPU 62, a ROM 64, a backup RAM 66, and a peripheral circuit 68, which are connected through a communication line 69. The peripheral circuit 68 includes, for example, a circuit that generates a clock signal setting an internal operation, a power supply circuit, and a reset circuit. The backup RAM 66 is a RAM that maintains the supply of power even when the main power supply of the controller 60 is turned off and power is not supplied to, for example, the CPU 62. When the CPU 62 runs programs stored in the ROM 64, the controller 60 controls the engine aspects described above.

Figure 2:
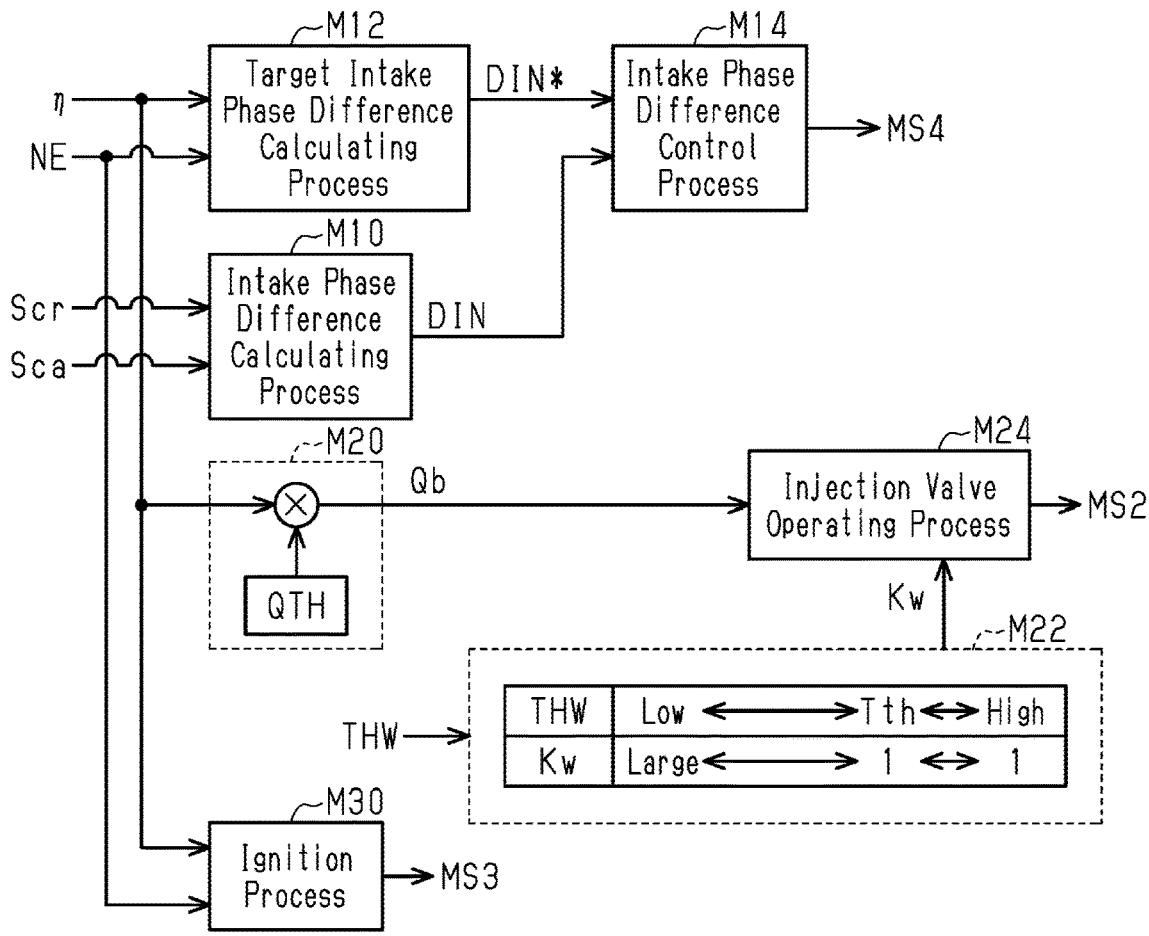
FIG. 2 is a block diagram showing a process executed by the controller according to the first embodiment.

FIG. 2 shows some of the processes executed by the controller 60. The processes shown in FIG. 2 are realized by the CPU 62 executing the programs stored in the ROM 64.

An intake phase difference calculating process M10 is a process that calculates an intake phase difference DIN, which is a phase difference of the rotational angle of the intake side camshaft 40 from the rotational angle of the crankshaft 28, based on the output signal Scr of the crank angle sensor 70 and the output signal Sca of the intake side cam angle sensor 76. A target intake phase difference calculating process M12 is a process that variably sets a target intake phase difference DIN* based on the actuation point of the internal combustion engine 10. In the first embodiment, the actuation point is defined by the rotational speed NE and the filling efficiency η. The CPU 62 calculates the rotational speed NE based on the output signal Scr of the crank angle sensor 70 and calculates the filling efficiency η based on the rotational speed NE and the intake air amount Ga. The filling efficiency η is a parameter that specifies the amount of air filled in the combustion chamber 24.

An intake phase difference control process M14 is a process that transmits the operation signal MS4 to the intake side valve timing adjustment device 44 so that the intake side valve timing adjustment device 44 is operated to control the intake phase difference DIN to the target intake phase difference DIN*.

A base injection amount calculating process M20 is a process that calculates a base injection amount Qb, which is a base value of the fuel amount for setting an air-fuel ratio of the air-fuel mixture in the combustion chamber 24 to a target air-fuel ratio, based on the filling efficiency η. Specifically, when the filling efficiency η is expressed as a percentage, for example, the base injection amount calculating process M20 may calculate the base injection amount Qb by multiplying the filling efficiency η and the fuel amount QTH per 1% of the filling efficiency η that sets the air-fuel ratio to the target air-fuel ratio. The base injection amount Qb is a fuel amount calculated to control the air-fuel ratio to the target air-fuel ratio based on the amount of air filled in the combustion chamber 24. The target air-fuel ratio may be, for example, a theoretical air-fuel ratio.

A low temperature correcting process M22 is a process that calculates a low temperature increase coefficient Kw to be a value greater than one in order to increase the base injection amount Qb when the water temperature THW is less than a predetermined temperature Tth (e.g., 60° C.). Specifically, when the water temperature THW is low, the low temperature increase coefficient Kw is calculated to be a greater value than when the water temperature THW is high. When the water temperature THW is greater than or equal to the predetermined temperature Tth, the low temperature increase coefficient Kw is set to one, and the correction amount of the base injection amount Qb by the low temperature increase coefficient Kw is set to zero.

An injection valve operating process M24 is a process that transmits the operation signal MS2 to the port injection valve 16 in order to operate the port injection valve 16. In particular, the injection valve operating process M24 is a process that injects a request injection amount Qd, which is a fuel amount requested to be supplied from the port injection valve 16 to one cylinder in one combustion cycle, from the port injection valve 16.

Figure 3:
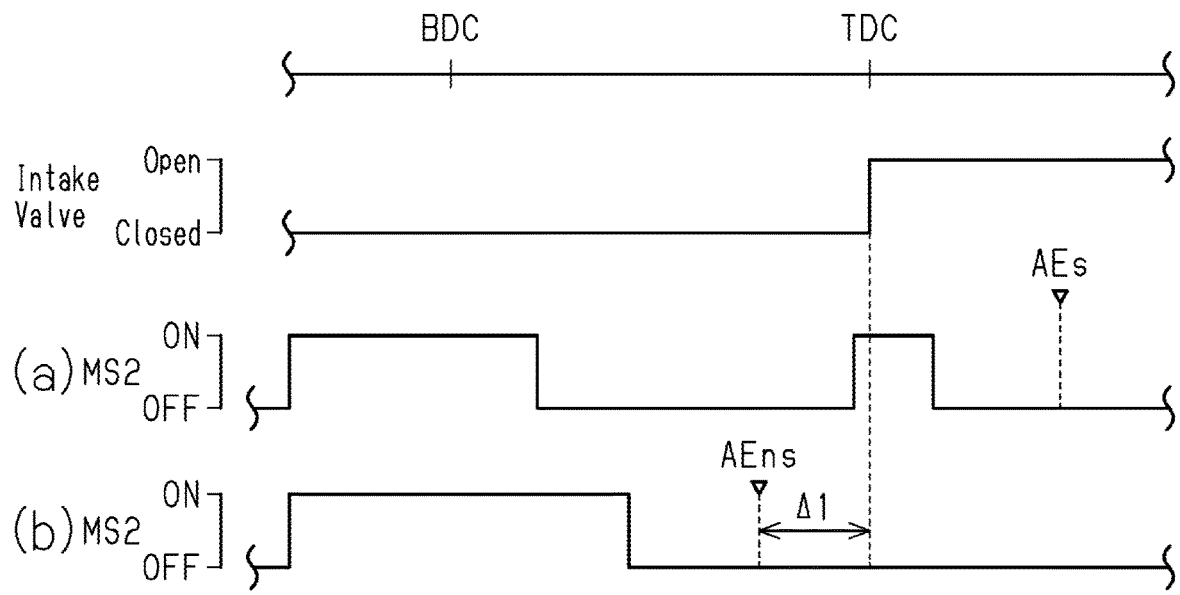
FIG. 3 is a time chart showing an injection pattern according to the first embodiment.

The injection valve operating process M24 includes the process shown in (a) in FIG. 3 and the process shown in (b) in FIG. 3 as two kinds of fuel injection processes.

The process shown in (a) in FIG. 3 is a multi-injection process that performs two fuel injections, namely, an intake synchronous injection in which fuel is injected in synchronization with a period in which the intake valve 18 is open and an intake asynchronous injection in which fuel is injected at timing advanced from the timing of executing the intake synchronous injection. Specifically, in the intake synchronous injection, fuel is injected so that the period in which the fuel injected from the port injection valve 16 reaches a position where the intake valve 18 is located prior to being open is included within a period in which the intake valve 18 is open. The position prior to being open refers to a downstream end of the intake port, namely, a portion of an inlet IN to the combustion chamber 24 shown in FIG. 1. FIG. 1 shows a state in which the intake valve 18 is open. The starting point of the "period in which the fuel injected from the port injection valve 16 reaches" is a point in time at which the fuel injected at the earliest time from the port injection valve 16 reaches the position prior to being open. The ending point is a point in time at which the fuel injected at the latest time from the port injection valve 16 reaches the position prior to being open. In contrast, in the intake asynchronous injection, fuel is injected so that the fuel injected from the port injection valve 16 reaches the intake valve 18 before the intake valve 18 opens. In other words, in the intake asynchronous injection, the fuel injected from the port injection valve 16 is retained in the intake passage 12 until the intake valve 18 is open, and flows into the combustion chamber 24 after the intake valve 18 is open. According to the first embodiment, in the intake asynchronous injection, fuel is injected so that the fuel injected from the port injection valve 16 reaches the position where the intake valve 18 is located prior to being open within a period in which the intake valve 18 is closed.

The process shown in (b) in FIG. 3 is a single injection process that performs only the intake asynchronous injection.

In the first embodiment, the multi-injection process is executed aiming to reduce the number (PN) of particulate matters (PM) in the exhaust air. More specifically, in a case in which the temperature of the intake system of the internal combustion engine 10 such as the intake passage 12 and the intake valve 18 is low at a certain level, the PN has a tendency to increase if the single injection process is executed in a region where the filling efficiency η is large at a certain level. It is considered that when the filling efficiency η is large, the request injection amount Qd has a greater value than when the filling efficiency η is small, and as a result, the amount of fuel collected on the intake system increases. Specifically, when the amount of fuel collected on the intake system increases to a certain level, it is presumed that the collected fuel is sheared and a portion of the collected fuel enters the combustion chamber 24 in the form of droplets. In this regard, in the first embodiment, a portion of the request injection amount Qd is injected in the intake synchronous injection. Thus, even when the request injection amount Qd is large, the amount of fuel collected on the intake system is reduced for the large request injection amount Qd. This eventually reduces the PN.

Figure 4:
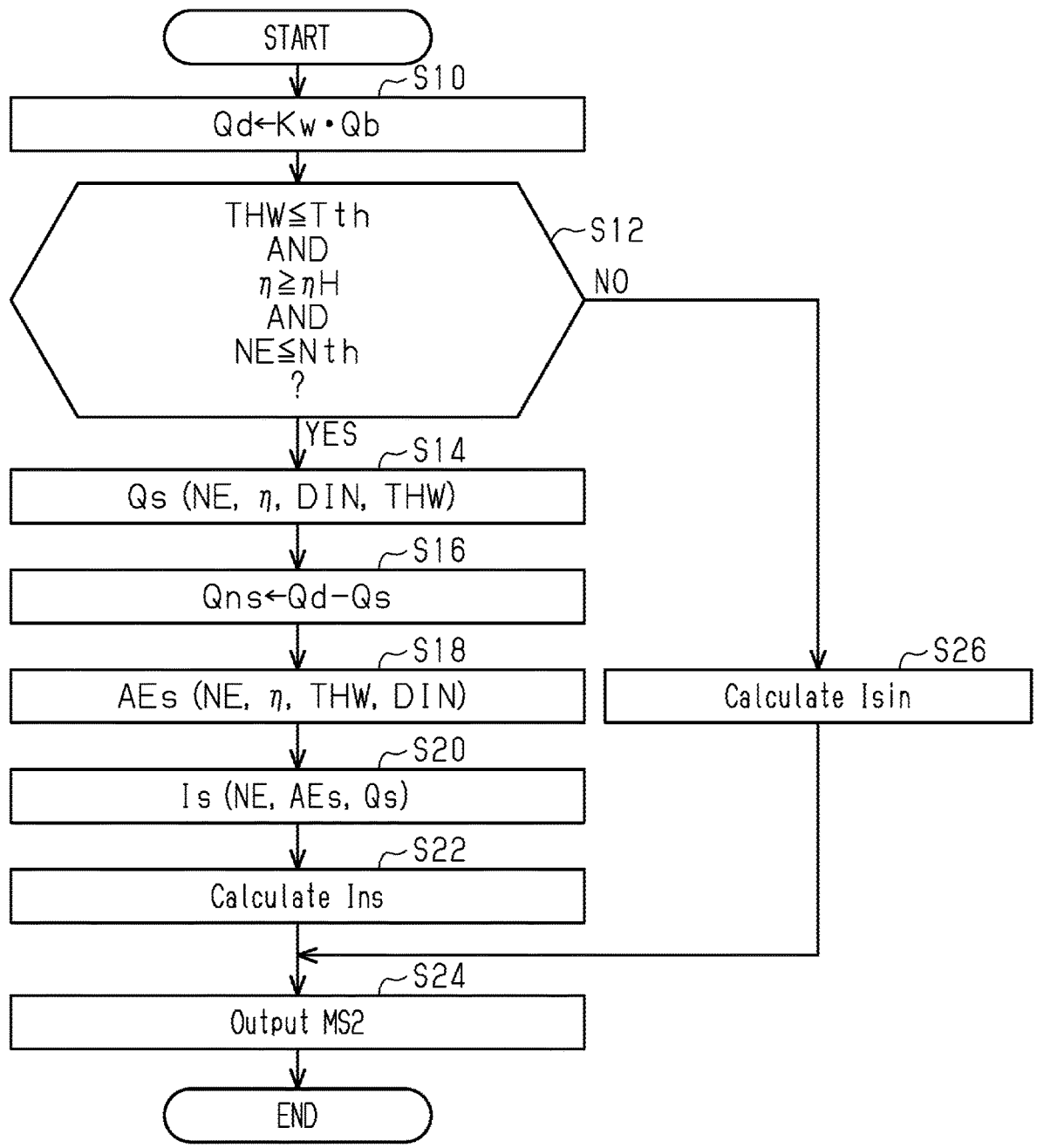
FIG. 4 is a flowchart showing the procedure of an injection valve operating process according to the first embodiment.

FIG. 4 shows the procedure of the injection valve operating process M24. The process shown in FIG. 4 is realized by the CPU 62 repeatedly executing the programs stored in the ROM 64, for example, in a predetermined cycle. Hereinafter, the step number of each process is represented by a numeral provided with "S" in front.

In the series of processes shown in FIG. 4, the CPU 62 calculates the request injection amount Qd by multiplying the low temperature increase coefficient Kw and the base injection amount Qb (S10). The CPU 62 determines whether the following condition (A), condition (B), and condition (C) are all true. Condition (A) is that the water temperature THW is lower than or equal to a predetermined temperature Tth. Condition (B) is that the filling efficiency η is greater than or equal to a specified value ηH. Condition (C) is that the rotational speed NE is less than or equal to a predetermined speed NEth. This process determines whether the execution condition of the multi-injection process is satisfied. The condition (C) is used for ensuring that the time interval between the ending time of the intake asynchronous injection and the starting time of the intake synchronous injection is greater than or equal to a predetermined amount of time. Furthermore, since the calculation load of the multi-injection process is greater than the calculation load of the single injection process, this condition is used to avoid generation of an excessive amount of heat caused by increases in the calculation load of the controller 60. The predetermined time is specified in accordance with the structure of the port injection valve 16 and is set to a value configured to avoid a situation in which the intake synchronous injection starts before the intake asynchronous injection ends.

When the CPU 62 makes an affirmative determination in S12 (S12: YES), the CPU 62 calculates a synchronous injection amount Qs, which is an injection amount of the intake synchronous injection (S14). The CPU 62 calculates the synchronous injection amount Qs in accordance with the rotational speed NE, the filling efficiency η, the water temperature THW, and the intake phase difference DIN. The synchronous injection amount Qs is adapted to a value appropriate for reducing the PN.

The CPU 62 subtracts the synchronous injection amount Qs from the request injection amount Qd to calculate an asynchronous injection amount Qns, which is an injection amount of the intake asynchronous injection (S16).

Thus, the sum of the asynchronous injection amount Qns and the synchronous injection amount Qs is equal to the request injection amount Qd. That is, the processes of S14 and S16 divide the fuel of the request injection amount Qd into the asynchronous injection amount Qns and the synchronous injection amount Qs.

The CPU 62 calculates an arrival completion time AEs shown in (a) in FIG. 3 based on the rotational speed NE, the filling efficiency η, the water temperature THW, and the intake phase difference DIN (S18). The arrival completion time AEs is the target value of time at which the fuel injected at the latest time from the port injection valve 16 reaches the position where the intake valve 18 is located prior to being open.

The CPU 62 calculates an injection start time Is (crank angle) of the intake synchronous injection based on the arrival completion time AEs obtained by the process of S18, the synchronous injection amount Qs, and the rotational speed NE (S20). The CPU 62 sets the injection start time Is to time advanced from the arrival completion time AEs by a value obtained by adding the injection period of the port injection valve 16 determined from the synchronous injection amount Qs, travel time, and invalid injection time. The travel time is the time the fuel injected from the port injection valve 16 takes to reach the inlet IN of the combustion chamber 24. The travel time is a fixed value in the first embodiment. The invalid injection time is the time from when the operation signal MS2 for opening the port injection valve 16 is output to when an actual fuel injection starts.

The CPU 62 calculates the injection start time Ins of the asynchronous injection based on the injection start time Is (S22). The time interval between the injection end time of the intake asynchronous injection and the injection start time Is is set to be greater than or equal to the predetermined amount of time.

The CPU 62 injects the fuel of the asynchronous injection amount Qns at the injection start time Ins. Then, the CPU 62 transmits the operation signal MS2 to the port injection valve 16 to operate the port injection valve 16 so that the fuel of the synchronous injection amount Qs is injected at the injection start time Is (S24).

When the CPU 62 determines that there is no request for the multi-injection process (S12: NO), the CPU 62 calculates the injection start time Isin of single injection (S26). Specifically, as shown in (b) in FIG. 3, the CPU 62 sets the arrival completion time AEns to time advanced from the time at which the intake valve 18 is started to open by a predetermined amount Δ1. Then, the CPU 62 sets the injection start time Isin to time advanced from the arrival completion time AEns by a value obtained by adding the injection period of the port injection valve 16 determined from the request injection amount Qd, the travel time, and the invalid injection time. Referring again to FIG. 4, the CPU 62 transmits the operation signal MS2 to the port injection valve 16 to operate the port injection valve 16 so that the fuel of the request injection amount Qd is injected at the injection start time Isin (S24).

When the process of S24 is completed, the CPU 62 temporarily terminates the series of processes shown in FIG. 4.

Referring again to FIG. 2, the ignition process M30 is a process that transmits the operation signal MS3 to the ignition device 26 to control the timing (ignition timing) of generating the spark discharge.

Figure 5:
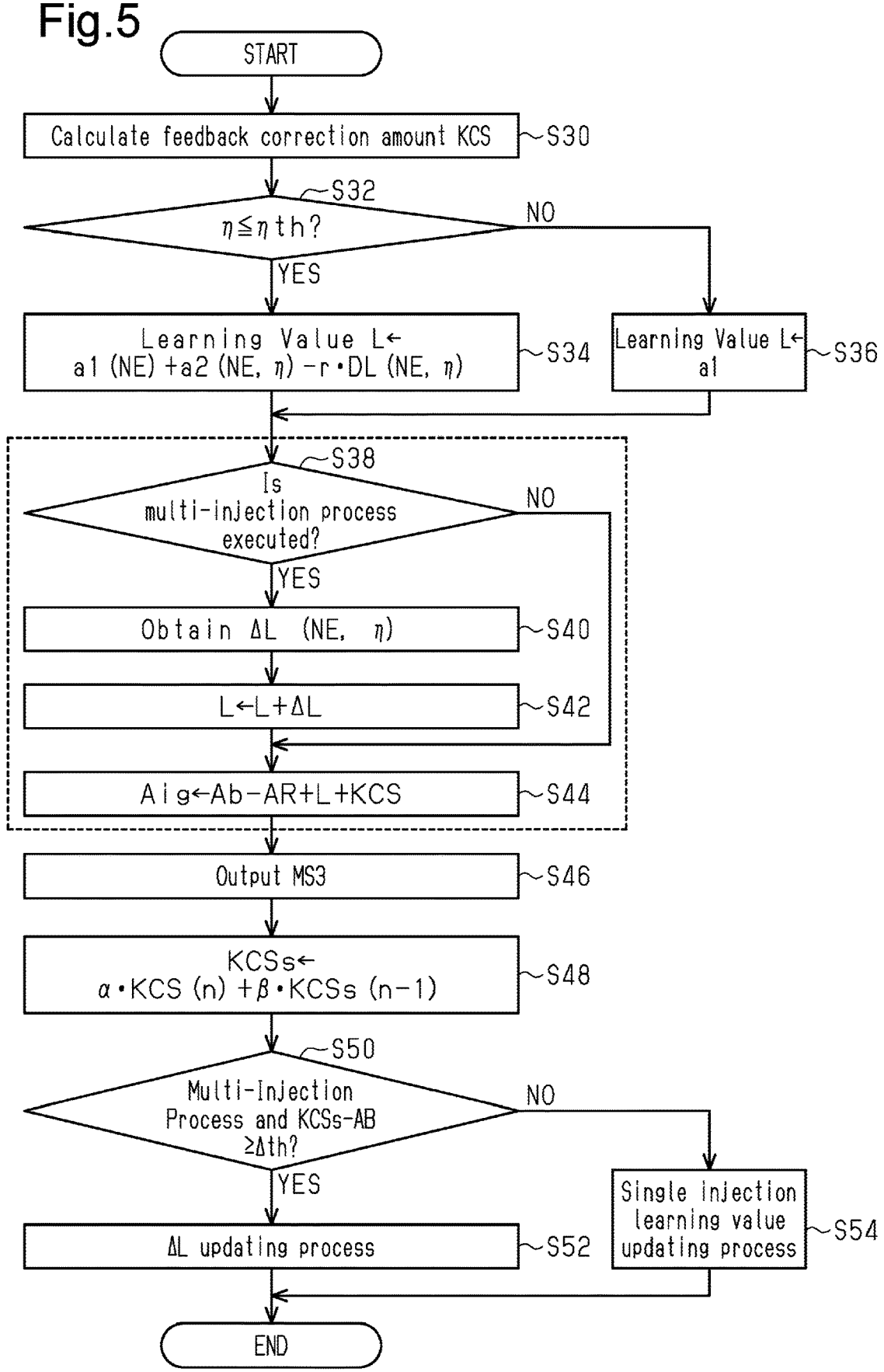
FIG. 5 is a flowchart showing the procedure of an ignition process according to the first embodiment.

FIG. 5 shows the procedure of the ignition process M30. The process shown in FIG. 5 is realized by the CPU 62 repeatedly executing the programs stored in the ROM 64, for example, in a cycle in which compression top dead center is reached for each cylinder.

In the series of processes shown in FIG. 5, the CPU 62 calculates a feedback correction amount KCS based on the output signal Sn of the knocking sensor 74 (S30). The feedback correction amount KCS is an operation amount for operating the ignition timing by feedback control. The ignition timing is allowed to be operated toward an advanced side in a range that limits occurrence of knocking. Specifically, when the vibration intensity based on the output signal Sn is greater than or equal to a predetermined value, the CPU 62 updates the feedback correction amount KCS by a retarded side update amount. As the amount of the vibration intensity exceeding the predetermined value increases, the CPU 62 increases the absolute value of the update amount. When the vibration intensity is less than or equal to a specified value (<predetermined value), the CPU 62 updates the feedback correction amount KCS toward the advanced side by a predetermined update amount. More specifically, when the vibration intensity is greater than or equal to the predetermined value and the feedback correction amount KCS is set to a retarded side value, the feedback correction amount KCS does not immediately return to the value that was set before the retarded side value even if the vibration intensity is less than or equal to the predetermined value in the next calculation cycle of the feedback correction amount KCS. Additionally, in the next calculation cycle, in which the feedback correction amount KCS is calculated to a further retarded side value, if the vibration intensity based on the output signal Sn is greater than or equal to the predetermined value, the feedback correction amount KCS is set to the further retarded side value. More specifically, the process that updates the retardation amount of the feedback correction amount KCS includes an integral operation. However, the CPU 62 executes a guard process that limits the absolute value of the feedback correction amount KCS to a predetermined value or less.

The CPU 62 determines whether the filling efficiency η is less than or equal to a predetermined value ηth (S32). The predetermined value η is set to the upper limit value of the filling efficiency η where EGR and deposits become noticeable as the factors of knocking. When it is determined that the predetermined value η is less than or equal to a predetermined value ηth (S32: YES), the CPU 62 assigns, to the learning value L, a value obtained by subtracting the product of a third learning value η and a deposit maximum retardation amount DL from the sum of a first learning value a1 and a second learning value a2 (S34). In the first embodiment, when the value of the first ignition timing is greater than the value of the second ignition timing, the value of the first ignition timing is referred to as an advanced side value as compared with the value of the second ignition timing. When the learning value L is a positive value, the learning value L is referred to as an advanced side correction amount. When the learning value L is a negative value, the learning value L is referred to as a retarded side correction amount.

The first learning value a1 is a value that is updated to decrease the absolute value of the feedback correction amount KCS for each of the regions divided by the rotational speed NE in the entire load region. The second learning value a2 is a value that is updated to decrease the absolute value of the feedback correction amount KCS for each of the regions divided by the rotational speed NE and the filling efficiency η in the low load region and the medium load region. The second learning value a2 is a value that mainly reflects the influence of the EGR and is used only in the low load region and the medium load region taking into consideration that the EGR amount and the knocking have a strong correlation in the low load region and the medium load region.

The deposit maximum retardation amount DL is the difference between the second knock limit point and the third knock limit point. The second knock limit point indicates the advance limit of the ignition timing (knock limit ignition timing) that keeps knocking within an acceptable level when a low octane rating fuel having a low knock limit is used and there is no collection of deposits. The third knock limit point indicates the advance limit of the ignition timing (knock limit ignition timing) that keeps knocking within an acceptable level when a low octane rating fuel having a low knock limit is used and a presumably maximum amount of deposit is collected. The deposit maximum retardation amount DL is set for each region divided by the rotational speed NE and the filling efficiency η.

The third learning value r is a value that is updated to decrease the absolute value of the feedback correction amount KCS in the low load region and the medium load region. In the process of S34, the CPU 62 executes a process that acquires the value corresponding to the present rotational speed NE from the first learning values a1 stored in the backup RAM 66 for each region divided by the rotational speed NE. In addition, the CPU 62 executes a process that acquires the value corresponding to the present rotational speed NE and filling efficiency η from the second learning values a2 stored in the backup RAM 66 for each region divided by the rotational speed NE and the filling efficiency η.

When it is determined that the predetermined value η is greater than the predetermined value ηth (S32: NO), the CPU 62 assigns the first learning value a1 to the learning value L (S36).

When the processes of S34 and S36 are completed, the CPU 62 determines whether the multi-injection process is executed (S38). When the CPU 62 determines that the multi-injection process is executed (S38: YES), the CPU 62 acquires the value corresponding to the present rotational speed NE and filling efficiency η from the multi-correction amounts ΔL stored in the backup RAM 66 for each region divided by the rotational speed NE and the filling efficiency η (S40). The CPU 62 assigns a value obtained by adding the multi-correction amount ΔL to the learning value L calculated by the process of S34 or S36 to the learning value L (S42). As a result, the learning value L that is used at the time of the multi-injection process becomes a value advanced by the multi-correction amount ΔL as compared to that used at the time of single injection process. The multi-correction amount ΔL is an advanced side correction amount. That is, the multi-correction amount ΔL is a value that advances the ignition timing used at the time of execution of the multi-injection process.

This is based on consideration that since the multi-injection process includes the intake synchronous injection, the latent heat of vaporization of fuel drawn into the combustion chamber 24 lowers the temperature inside combustion chamber 24 as compared with the time of the single injection process. When the temperature in the combustion chamber 24 is lowered, occurrence of knocking is limited. This allows the ignition timing to be readily set to the advanced side.

Figure 6:
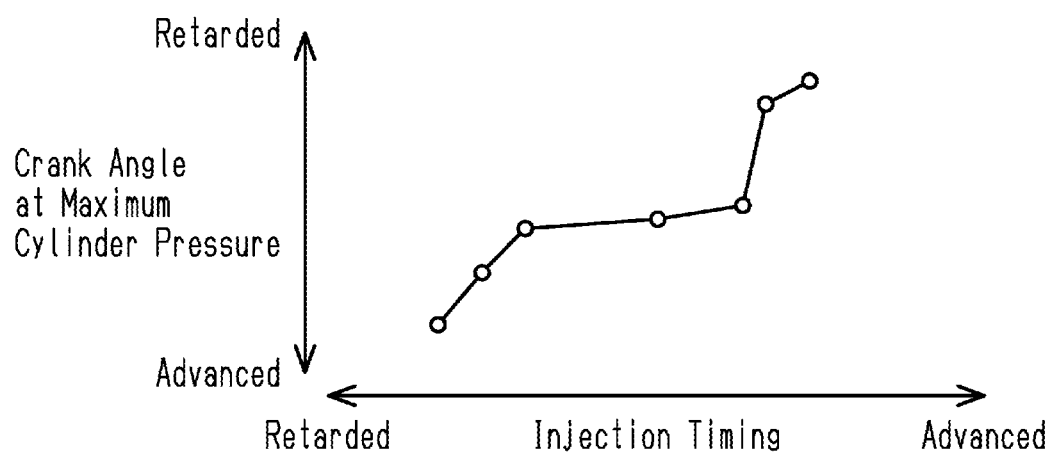
FIG. 6 is a view showing the relationship between the injection timing and the crank angle at which the pressure of a cylinder is maximum according to the first embodiment.

FIG. 6 shows the relationship between the injection timing and the crank angle at which the pressure (pressure of cylinder) in the combustion chamber 24 becomes a maximum. As shown in FIG. 6, as the injection timing is retarded, the crank angle at which the pressure of the combustion chamber 24 is maximum is shifted toward the advanced side. When the crank angle corresponding to the maximum pressure of the combustion chamber 24 is shifted toward the advanced side, occurrence of knocking is limited. This allows the ignition timing to be set to an advanced side value. This means that in the intake synchronous injection, knocking is less likely to occur than in the intake asynchronous injection, and the ignition timing may be advanced.

Referring again to FIG. 5, when the process of S42 is completed or when a negative determination is made in the process of S38, the CPU 62 assigns "Ab−AR+L+KCS" to the ignition timing Aig (S44). The most advanced ignition timing Ab is the further retarded one of the MBT ignition timing and the first knock limit point. The MBT ignition timing is an ignition timing (maximum torque ignition timing) at which the maximum torque is obtained. The first knock limit point is the advance limit value of the ignition timing (knock limit ignition timing) that keeps knocking within an acceptable level under the presumably best conditions when a high octane rating fuel having a high knock limit is used. The delay difference AR is the difference between the most advanced ignition timing Ab and the second knock limit point.

The CPU 62 transmits the operation signal MS3 to the ignition device 26 to operate the ignition device 26 so that spark discharge occurs at the ignition timing Aig (S46).

The CPU 62 calculates a learning correction amount KCSs used for updating the learning value by an exponential moving average process of the feedback correction amount KCS (S48). Specifically, positive weight coefficients α and β that satisfy "α+β=1" are used to assign "α·KCS(n)+β·KCSs(n−1)" to the current learning correction amount KCSs(n). The variable n represents the latest value in the control cycle shown in FIG. 5, and "n−1" represents the previous value.

The CPU 62 determines whether multi-injection process is executed and whether the value obtained by subtracting a reference advance amount AB from the learning correction amount KCSs is greater than or equal to a predetermined value Δth (S50). This process determines whether to update the multi-correction amount ΔL.

When the CPU 62 makes an affirmative determination in S50 (S50: YES), the CPU 62 updates the value corresponding to the present rotational speed NE and filling efficiency η from the multi-correction amounts ΔL stored in the backup RAM 66 for each region divided by the rotational speed NE and the filling efficiency η based on the learning correction amount KCSs (S52). Specifically, the CPU 62 corrects the multi-correction amount ΔL by advancing by "KCSs−AB." At this time, the CPU 62 executes correction that subtracts "KCSs−AB" from the feedback correction amount KCS and the learning correction amount KCSs. When the learning process has not yet been executed, the value (initial value) of the multi-correction amount ΔL may be a value greater than zero.

When the CPU 62 makes a negative determination in S50 (S50: NO), the CPU 62 updates appropriate learning values other than the multi-correction amount ΔL (S54). Specifically, when the filling efficiency η is less than or equal to the predetermined value ηth and the value obtained by subtracting the reference advance amount AB from the learning correction amount KCSs is greater than or equal to the predetermined value Δth, the first learning value a1 and the second learning value a2 are advanced to be updated. The sum of the update amount of the first learning value a1 and the update amount of the second learning value a2 is set to "KCSs−AB," and the ratio of the two update amounts is set to a predetermined ratio. When the filling efficiency η is less than or equal to the predetermined value ηth and the value obtained by subtracting a reference delay amount AA from the learning correction amount KCSs is less than or equal to the predetermined value Δth, the first learning value a1, the second learning value a2, and third learning value r are advanced to be updated. The sum of the update amount of the first learning value a1, the update amount of the second learning value a2, and the update amount of "r·DL" is set to "KCSs−AA," and these three updated amounts are set to a predetermined ratio. When the filling efficiency η is greater than the predetermined value ηth, the CPU 62 updates only the first learning value a1.

When the processes of S52 and S54 are completed, the CPU 62 temporarily terminates the series of processes shown in FIG. 5.

The operations and effects of the first embodiment will be described.

Figure 7:
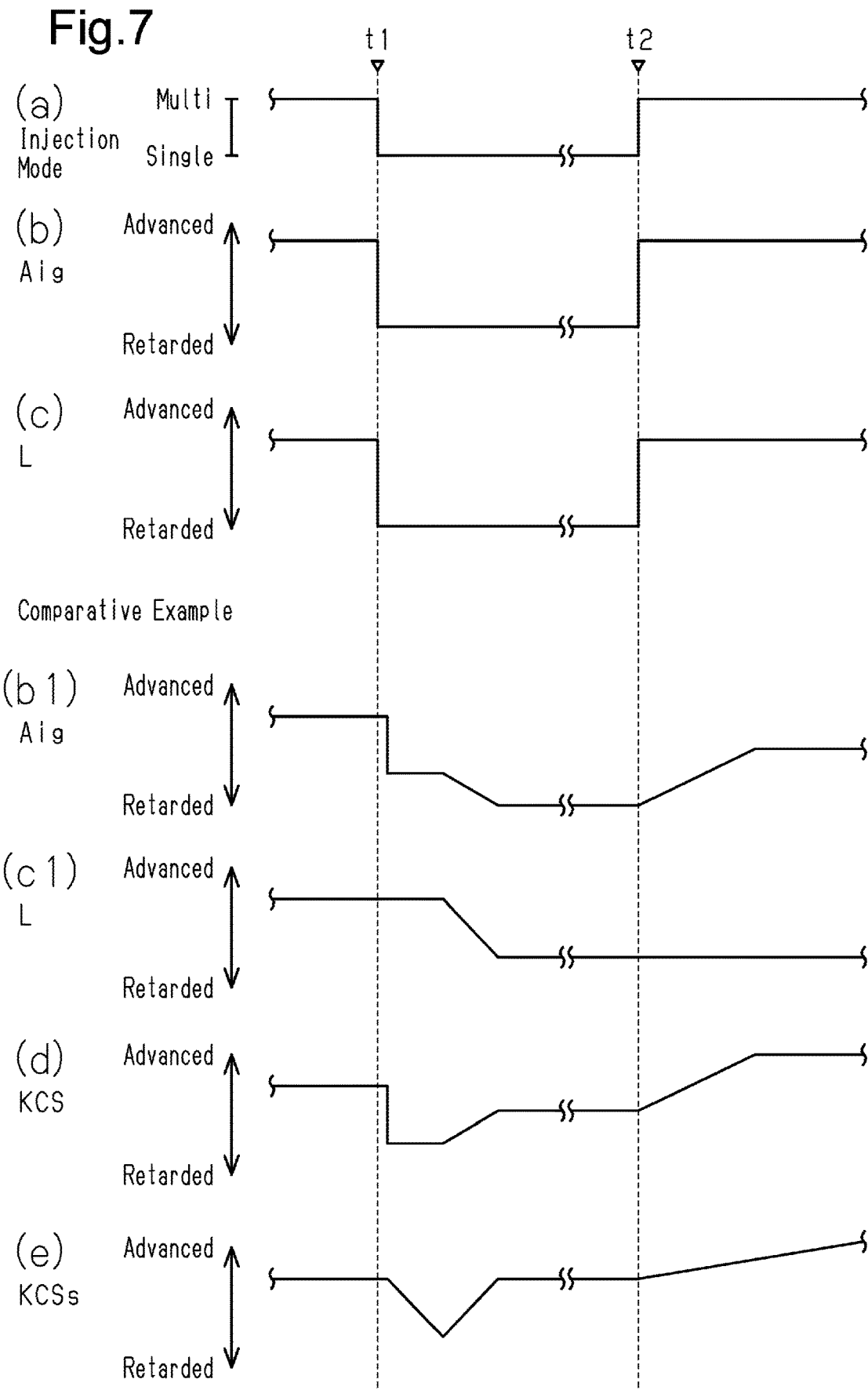
FIG. 7 is a time chart illustrating a setting process of the ignition timing according to the first embodiment and a comparative example.

Switching between the multi-injection process and the single injection process in the first embodiment is shown in (a) in FIG. 7. Changes in the ignition timing Aig in the first embodiment are shown in (b) in FIG. 7. Changes in the learning value L in the first embodiment are shown in (c) in FIG. 7.

As shown in FIG. 7, at time t1, when the switching from the multi-injection process to the single injection process is used as a trigger, the CPU 62 sets the learning value L without using the multi-correction amount ΔL so the learning value L is set to a retarded side value. As a result, the ignition timing Aig is also switched to a retarded side value, whereby knocking may be limited.

Changes in the ignition timing Aig in a comparative example that does not use the multi-correction amount ΔL are shown in (b1) in FIG. 7. Changes in the learning value L in the comparative example are shown in (c1) in FIG. 7. Changes in the feedback correction amount KCS in the comparative example are shown in (d) in FIG. 7. Changes in the learning correction amount KCSs in the comparative example are shown in (e) in FIG. 7.

As shown in FIG. 7, in the case of the comparative example, when the multi-injection process is switched to the single injection process at time t1, knocking occurs and the feedback correction amount KCS is set to a retarded side value. However, since the absolute value of the feedback correction amount KCS is limited, the ignition timing does not become the same as that of the first embodiment at once and is set to a further advanced side value. This updates the learning correction amount KCSs. When the absolute value of the learning correction amount KCSs is increased to a certain extent, the learning value L is updated. The updating of the learning value L allows the ignition timing to be set to a further retarded side value. Thus, in the comparative example, it takes a longer time for the ignition timing to reach an ignition timing at which knocking does not occur than in the first embodiment.

In the first embodiment, at time t2, when the switching from the single injection process to the multi-injection process is used as a trigger, the CPU 62 switches the learning value L to a further advanced side value by using the multi-correction amount ΔL. As a result, the ignition timing is set to a further advanced side value.

In the comparative example, when the single injection process is switched to the multi-injection process, the feedback correction amount KCS is gradually updated to the advanced side, whereby the ignition timing is updated to the advanced side. When the feedback correction amount KCS is updated to an advanced side value, the learning correction amount KCSs is also updated to an advanced side value. However, the update speed is low, and the learning value L takes a long time to be updated to the advanced side. As a result, after switching to the multi-injection process, the ignition timing undesirably continues to be set to the retarded side for a long time, and the fuel consumption rate increases.

The first embodiment described above further has the following effects.

(1) The multi-correction amount ΔL is used. Thus, even in a region that does not use the second learning values a2, which are learning values to which different values are set in accordance with the filling efficiency η, the learning value L is appropriately set at the time of the multi-injection process, which is executed in accordance with the level of the filling efficiency η. Furthermore, even in a region that uses the second learning value a2, whether the multi-injection process is executed is determined depending on the water temperature THW. Thus, depending on the second learning value a2, an appropriate learning value L may not be calculated in accordance with whether the water temperature THW is higher than or equal to a predetermined temperature Tth. When the multi-correction amount ΔL is used, an appropriate learning value L may be calculated in accordance with whether the water temperature THW is higher than or equal to a predetermined temperature Tth.

Second Embodiment

A second embodiment will be described below with reference to the drawings, focusing on the differences from the first embodiment.

Figure 8:
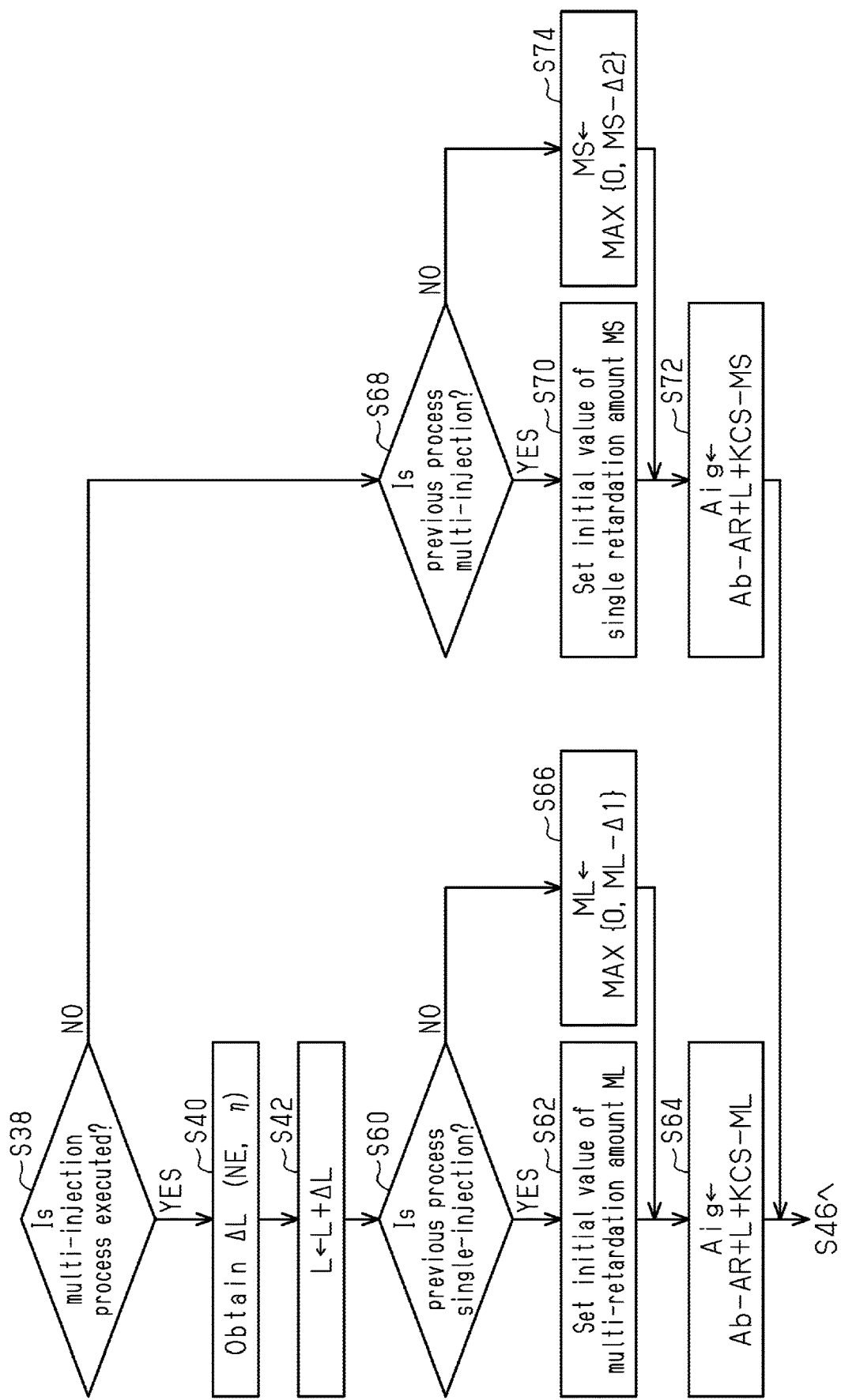
FIG. 8 is a flowchart showing the procedure of an ignition process according to a second embodiment.

FIG. 8 shows a procedure of the ignition process M30 according to the second embodiment. The process shown in FIG. 8 is realized by the CPU 62 repeatedly executing the programs stored in the ROM 64, for example, in a cycle in which compression top dead center is reached for each cylinder. FIG. 8 shows only the process corresponding to the portion surrounded by the broken lines shown in FIG. 5. The portion of the process that is not surrounded by the broken lines in FIG. 5 is the same as the process of the second embodiment.

As shown in FIG. 8, when the process of S42 is completed, the CPU 62 determines whether the previous fuel injection process is a single injection process (S60). When it is determined that the previous fuel injection process is the single injection process (S60: YES), the CPU 62 sets an initial value of the multi-retardation amount ML (S62). Determination that the previous fuel injection process is the single injection process means the switching from the single injection process to the multi-injection process. In the second embodiment, the initial value of the multi-retardation amount ML is set to a value greater than the multi-correction amount ΔL. The CPU 62 assigns "Ab−AR+L+KCS−ML" to the ignition timing Aig (S64). The multi-retardation amount ML is a parameter having a value greater than or equal to zero.

When it is determined that the previous fuel injection process is not the single injection process (S60: NO), the CPU 62 assigns the greater one of zero and the value obtained by subtracting the predetermined amount Δ1 from the multi-retardation amount ML to the multi-retardation amount ML (S66). This process is executed so that the multi-retardation amount ML gradually approaches zero. When the process of S66 is completed, the CPU 62 proceeds to the process of S64.

When a negative determination is made in the process of S38, the CPU 62 determines whether the previous fuel injection process is the multi-injection process (S68). When it is determined that the previous fuel injection process is the multi-injection process (S68: YES), the CPU 62 sets an initial value of the single retardation amount MS (S70). The determination that the previous fuel injection process is multi-injection process means the switching from the multi-injection process to the single injection process. The initial value of the single retardation amount MS is a value greater than zero. The CPU 62 assigns "Ab−AR+L+KCS−MS" to the ignition timing Aig (S72).

When it is determined that the previous fuel injection process is not the multi-injection process (S68: NO), the CPU 62 assigns the greater one of zero and the value obtained by subtracting the predetermined amount Δ2 from the single retardation amount MS to the single retardation amount MS (S74). This process is executed so that the single retardation amount MS gradually approaches zero. When the process of S74 is completed, the CPU 62 proceeds to the process of S72.

When the processes of S64 and S72 are completed, the CPU 62 proceeds to the process of S46 shown in FIG. 5.

The operations and effects of the second embodiment will be described.

Figure 9:
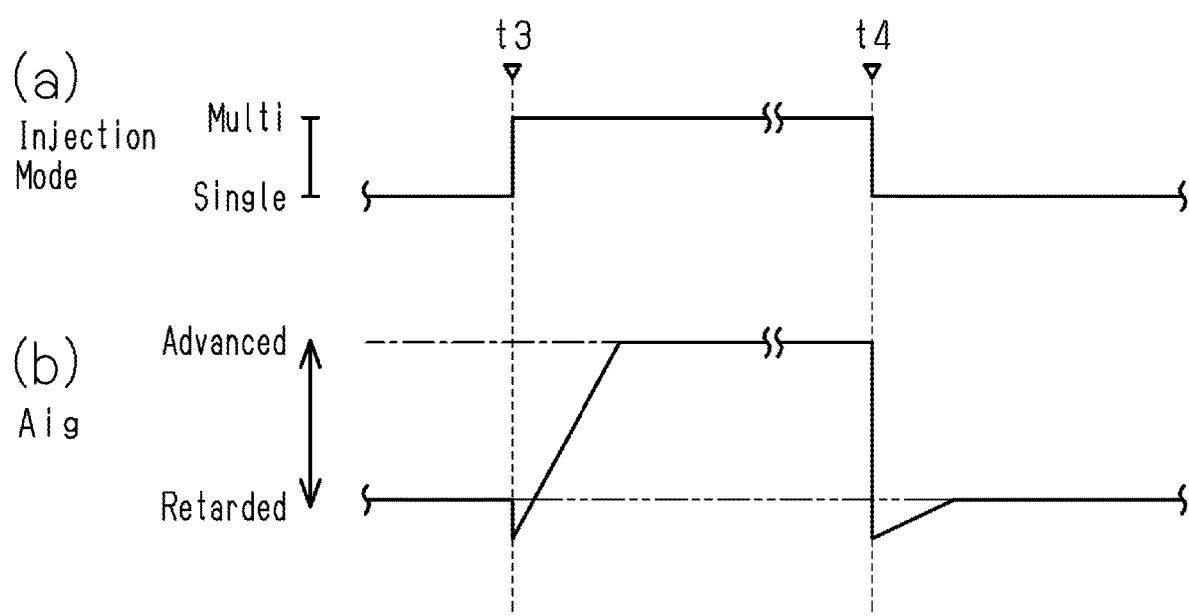
FIG. 9 is a time chart illustrating a setting process of the ignition timing according to the second embodiment.

Switching between the multi-injection process and the single injection process in the second embodiment is shown in (a) in FIG. 9. Changes in the ignition timing Aig in the second embodiment are shown in (b) in FIG. 9.

At time t3, when the switching from the single injection process to the multi-injection process is used as a trigger, the CPU 62 does not immediately switch the ignition timing Aig to the ignition timing that corresponds to the multi-correction amount ΔL and indicated with the single-dashed line in (b) in FIG. 9. Instead, the CPU 62 gradually changes the ignition timing Aig over a number of combustion cycles. When the multi-injection process is steadily performed, the multi-correction amount ΔL tends to have an appropriate value. However, immediately after switching to the multi-injection process, the temperature in the combustion chamber 24 may be higher than when the multi-injection process is steadily performed. Thus, if the ignition timing Aig is advanced corresponding to the multi-correction amount ΔL immediately after the switching of the multi-injection process, knocking may occur. In this regard, in the second embodiment, in accordance with the switching to the multi-injection process, the ignition timing Aig is gradually shifted corresponding to the multi-correction amount ΔL. This limits knocking. Additionally, in the second embodiment, immediately after the switching to the multi-injection process, the ignition timing Aig is temporarily set to timing retarded from the ignition timing Aig used at the time of execution of the single injection process. Thus, occurrence of knocking is limited during transition.

At time t4, when the switching from the multi-injection process to the single injection process is used as the trigger, the CPU 62 sets the ignition timing Aig to timing further retarded from the value used at the time of execution of the single injection process that does not use the multi-correction amount ΔL and is shown by the double-dashed line in (b) in FIG. 9. The value used at the time of execution of the single injection process that does not use the multi-correction amount ΔL is "Ab−AR+L+KCS" in a case in which the process of S42 is not performed. Thereafter, the CPU 62 gradually shifts the ignition timing Aig to the value used at the time of execution of the single injection process that does not use the multi-correction amount ΔL. Thus, occurrence of knocking is limited during transition.

Correspondence Relationship

Correspondence relationship between the matters in the embodiments described above and the matters described in the section "SUMMARY" is as follows. Hereinafter, the correspondence relationship is described for the number of each aspect described in the section "SUMMARY."

[1, 2] The selecting process corresponds to the process of S12. The injecting process corresponds to the process of S24. The switching process corresponds to the processes of S38 to S42 in FIG. 5 and S38 to S42 and S60 to S74 in FIG. 8.

[3] The feedback correction amount calculating process corresponds to the process of S30. The updating process corresponds to the processes of S50 to S54. The setting process corresponds to the processes of S44, S64, and S72.

[4] The single injection learning value corresponds to the learning value calculated by the process of S34. The multi-injection learning value corresponds to the learning value calculated by the process of S42.

[5] In the process of S52, the multi-correction amount ΔL corresponds to updating for each rotational speed NE and filling efficiency η.

[6] The retarding process corresponds to the processes of S62 and S64. The shifting process corresponds to the processes of S60, S64, and S66.

[7] The retarding process corresponds to the processes of S70 and S72. The shifting process corresponds to the processes of S68, S72, and S74.

OTHER EMBODIMENTS

The first and second embodiments may be modified and implemented as below. The first and second embodiments as well as the following modified examples may be implemented by being combined with each other within a scope that does not technically conflict with each other.

Retarding Process

In the embodiments described above, the initial value of the multi-retardation amount ML is greater than the multi-correction amount ΔL. However, there is no limit to such a configuration.

In the second embodiment, in accordance with the switching from execution of the multi-injection process to execution of the single injection process, the ignition timing is set to be retarded from the timing determined from the learning value L by the single retardation amount MS. However, there is no limit to such a configuration. For example, while the multi-retardation amount ML may be provided, the single retardation amount MS may not be provided.

Updating Process

In the embodiments described above, the multi-correction amount ΔL is updated for each region divided by the rotational speed NE and the filling efficiency η. However, there is no limit to such a configuration. For example, instead of using the filling efficiency η, the base injection amount Qb or the request injection amount Qd may be used as the load. For example, the multi-correction amount ΔL may be updated for each region divided by only the load without depending on the rotational speed NE.

In the embodiments described above, when the learning correction amount KCSs is greater than the reference advance amount AB used at the time of execution of the multi-injection process, only the multi-correction amount ΔL is corrected based on the learning correction amount KCSs However, there is no limit to such a configuration. For example, the sum of an update amount of the first learning value a1, an update amount of the second learning value a2, and an update amount of the multi-correction amount ΔL may be "KCSs−AB."

In the embodiments described above, the exponential moving average process value of the feedback correction amount KCS is used as the learning correction amount KCSs. However, there is no limit to such a configuration. For example, the low pass filter processing value of the feedback correction amount KCS may be used as the learning correction amount KCSs.

Switching Process

In the embodiments described above, the multi-correction amount ΔL is used to set the learning value for knocking control to different values between the multi-injection process and the single injection process. However, there is no limit to such a configuration. For example, the second learning value a2 may be used for setting the ignition timing Aig in the entire region of the filling efficiency η, and also the second learning value a2 may be updated for each region divided in accordance with the rotational speed NE, the filling efficiency η, and the water temperature THW. If the divided regions allow for distinguishing between an execution region of the multi-injection process and an execution region of the single injection process, the second learning value a2 may be used to set the learning value for knocking control to different values between the multi-injection process and the single injection process. For example, as described below in the section of "Selecting Process," when the condition (A) is deleted from the execution condition of the multi-injection process, the second learning value a2 may be used to set the ignition timing Aig in the entire region of the filling efficiency 11 and may be a value updated for each region that is not divided by the water temperature THW.

Furthermore, the learning values for knocking control do not necessarily have to be set to different values between the multi-injection process and the single injection process. For example, a value for the multi-injection process and a value for the single injection process may be stored as the most advanced ignition timing Ab. This can be realized by storing two pieces of data, data for the multi-injection process and data for the single injection process, in the ROM 64 as map data having the most advanced ignition timing Ab as an output variable. The map data is set data including discrete values of the input variable and values of the output variable corresponding to each of the values of the input variable.

Ignition Process

For example, as described in the section "Switching Process," when storing the value for multi-injection process and the value for single injection process as the most advanced ignition timing Ab, the ignition timing Aig may be delayed using the switching from the multi-injection to the single injection as a trigger without using the learning value L or the feedback correction amount KCS for the setting of the ignition timing Aig.

Selecting Process

The conditions for selecting the multi-injection process are not limited to those exemplified in the above embodiments. For example, instead of the condition (C), a condition that the filling efficiency 11 is less than a predetermined value may be used. The predetermined value is greater than the specified value used in the condition (B). For example, the predetermined temperature Tth in the condition (A) does not necessarily have to be the same as the predetermined temperature Tth for determining the water temperature THW when the low temperature increase coefficient Kw is greater than one.

Furthermore, the condition (A) may be deleted.

Synchronous Injection Amount Calculating Process

The synchronous injection amount Qs does not necessarily have to be calculated based on the rotational speed NE, the filling efficiency η, the intake phase difference DIN and the water temperature THW. For example, the calculation may be performed based on only three, two, or one of the four parameters.

The parameter indicating the amount of air filled in the combustion chamber 24 is not limited to the filling efficiency η and may be, for example, the base injection amount Qb. Furthermore, for example, in view of the positive correlation between the intake pressure and the filling efficiency η, the intake pressure may be used as the above-mentioned parameter.

Intake Synchronous Injection

In the embodiments described above, the arrival completion time AEs is set based on the rotational speed NE, the filling efficiency η, the water temperature THW, and the intake phase difference DIN. However, there is no limit to such a configuration. For example, the injection start time Is may be directly set based on the rotational speed NE, the filling efficiency η, the water temperature THW, and the intake phase difference DIN. Furthermore, instead of using the filling efficiency η, for example, the base injection amount Qb may be used as a parameter indicating a load that is a parameter indicating the amount of air filled in the combustion chamber 24. In addition, the arrival completion time AEs and the injection start time Is may be variably set based on only three, two, or one of the four parameters, that is, the rotational speed NE, the load, the water temperature THW, and the intake phase difference DIN.

Intake Asynchronous Injection

In the embodiments described above, in the intake asynchronous injection, the fuel is injected so that the fuel injected from the port injection valve 16 reaches the position where the intake valve 18 is located prior to being open within a period in which the intake valve 18 is closed. However, there is no limit to such a configuration. For example, when the rotational speed NE is high and the asynchronous injection amount Qns is excessively large, the period in which the fuel is injected from the port injection valve 16 and reaches the position where the intake valve 18 is located prior to being open may partially overlap with a period in which the intake valve 18 is open.

Single Injection Process

In the embodiments described above, in the single injection process, the fuel is injected so that the fuel injected from the port injection valve 16 reaches the position where the intake valve 18 is located prior to being open within a period in which the intake valve 18 is closed. However, there is no limit to such a configuration. For example, when the rotational speed NE is high and the request injection amount Qd is large, the period in which the fuel is injected from the port injection valve 16 and reaches the position where the intake valve 18 is located prior to being open may partially overlap with a period in which the intake valve 18 is open.

Controller

The controller is not limited to one including the CPU 62 and the ROM 64 and executing software processes. For example, a dedicated hardware circuit (e.g., ASIC, etc.) may be arranged to process at least some of the software processes executed in the embodiment described above. In other words, the controller may have any of the configurations (a) to (c) described below. Configuration (a) includes a processing device that executes all of the above processes in accordance with a program, and a program storage device such as a ROM that stores the program. Configuration (b) includes a processing device that execute some of the above processes in accordance with a program and a program storage device, and a dedicated hardware circuit that executes the remaining processes. Configuration (c) includes a dedicated hardware circuit that executes all of the above processes. The number of software circuits including a processing device and a program storage device and the number of dedicated hardware circuits may each be more than one. In other words, the processes described above may be executed by processing circuitry that includes at least one of one or more software circuits or one or more dedicated hardware circuits. The program storage device, that is, a computer readable medium, includes various available media that can be accessed with a general-purpose or dedicated computer.

Others

The internal combustion engine 10 does not necessarily have to have a characteristic varying device that changes the characteristics of the intake valve 18. The internal combustion engine 10 does not necessarily have to include the throttle valve 14. The request injection amount Qd is not limited to that exemplified in the above embodiments and for example, may be a value obtained by correcting the base injection amount Qb in accordance with an operation amount of air-fuel ratio feedback control.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A controller for an internal combustion engine that includes a port injection valve configured to inject fuel into an intake passage and an ignition device configured to cause spark discharge to occur in a combustion chamber, the controller comprising:
a processor programmed to execute:
a selecting process that selects one of a multi-injection process or a single injection process, an injection amount requested in one combustion cycle being a request injection amount, the multi-injection process including executing an intake synchronous injection and an intake asynchronous injection to inject fuel of the request injection amount, the single injection process including executing the intake asynchronous injection to inject fuel of the request injection amount, in the intake synchronous injection, the fuel being injected in synchronization with a period in which an intake valve is open, and in the intake asynchronous injection, the fuel being injected at timing advanced from timing of executing the intake synchronous injection;
an injecting process that operates the port injection valve to execute one of the multi-injection process or the single injection process selected by the selecting process; and
an ignition process that operates the ignition device, wherein the ignition process includes a switching process that changes an ignition timing to a retarded side value in accordance with switching from execution of the multi-injection process to execution of the single injection process.

2. The controller according to claim 1, wherein the switching process includes a process that advances the ignition timing in accordance with switching from execution of the single injection process to execution of the multi-injection process.

3. The controller according to claim 1, wherein
the ignition process includes
a feedback correction amount calculating process that calculates a feedback correction amount based on an output signal of a knocking sensor, the feedback correction amount being an operation amount for operating the ignition timing by feedback control, and the ignition timing being allowed to be operated toward an advanced side within a range in which occurrence of knocking is limited, and
an updating process that updates a learning value to decrease an absolute value of the feedback correction amount, and
the switching process includes
a setting process that sets the ignition timing based on the feedback correction amount and the learning value, and
a process that switches between a learning value used in the setting process at a time of execution of the multi-injection process and a learning value used in the setting process at a time of execution of the single injection process.

4. The controller according to claim 3, wherein
the learning value used at the time of execution of the single injection process is a single injection learning value,
the learning value used at the time of execution of the multi-injection process is a multi-injection learning value,
the multi-injection learning value is obtained by correcting the single injection learning value with a multi-correction amount, which is an advance-side correction amount,
the switching process includes a process that sets the multi-injection learning value to the learning value used in the setting process at the time of execution of the multi-injection process, and
the updating process includes:
a process that updates the single injection learning value based on the feedback correction amount when the single injection process is being executed; and
a process that updates the multi-correction amount based on the feedback correction amount when the multi-injection process is being executed.

5. The controller according to claim 4, wherein the updating process includes updating the multi-correction amount separately according to a rotational speed and a load of a crankshaft of the internal combustion engine.

6. The controller according to claim 4, wherein the switching process includes:
- a retarding process that sets an ignition timing obtained by retarding an ignition timing determined based on the multi-injection learning value by a multi-retardation amount in accordance with switching from execution of the single injection process to execution of the multi-injection process; and
- a shifting process that shifts the ignition timing set by the retarding process to the ignition timing determined based on the multi-injection learning value by gradually reducing the multi-retardation amount.

7. The controller according to claim 4, wherein the switching process includes:
- a retarding process that sets an ignition timing obtained by retarding an ignition timing determined based on the single injection learning value by a single retardation amount in accordance with switching from execution of the multi-injection process to execution of the single injection process; and
- a shifting process that shifts the ignition timing set by the retarding process to the ignition timing determined based on the single injection learning value by gradually reducing the single retardation amount.

8. A method for controlling an internal combustion engine that includes a port injection valve configured to inject fuel into an intake passage and an ignition device configured to cause spark discharge to occur in a combustion chamber, the method comprising, using a processor:
- executing a selecting process that selects one of a multi-injection process or a single injection process, an injection amount requested in one combustion cycle being a request injection amount, the multi-injection process including executing an intake synchronous injection and an intake asynchronous injection to inject fuel of the request injection amount, the single injection process including executing the intake asynchronous injection to inject fuel of the request injection amount, in the intake synchronous injection, the fuel being injected in synchronization with a period in which an intake valve is open, and in the intake asynchronous injection, the fuel being injected at timing advanced from timing of executing the intake synchronous injection;
- executing an injecting process that operates the port injection valve to execute one of the multi-injection process or the single injection process selected by the selecting process; and
- executing an ignition process that operates the ignition device, wherein the ignition process includes a switching process that changes an ignition timing to a retarded side value in accordance with switching from execution of the multi-injection process to execution of the single injection process.

* * * * *